E. BIGELOW, dec'd., L. P. BIGELOW, admr'x.,

J. MATTHEWS, assignee by mesne assignments.

Liquid Cooler for Cooling Liquids Under Pressure.

No. 9,273. Reissued June 29, 1880.

Witnesses.
John C. Trenbridge
Willy G. E. Schultz.

John Matthews
assignee of
E. Bigelow deceased
by his attorney
A. v. Briesen

N. PETERS, PHOTO-LITHOGRAPHER, WASHINGTON, D. C.

UNITED STATES PATENT OFFICE.

JOHN MATTHEWS, OF NEW YORK, N. Y., ASSIGNEE, BY MESNE ASSIGNMENTS, OF LUCY P. BIGELOW, ADMINISTRATRIX OF EDMUND BIGELOW, DECEASED.

LIQUID-COOLER FOR COOLING LIQUIDS UNDER PRESSURE.

SPECIFICATION forming part of Reissued Letters Patent No. 9,273, dated June 29, 1880.

Original No. 108,318, dated October 18, 1870. Application for reissue filed December 18, 1879.

DIVISION B.

*To all whom it may concern:*

Be it known that EDMUND BIGELOW, deceased, formerly of Springfield, in the county of Hampden and State of Massachusetts, did invent a new and useful Improvement in Liquid-Coolers for Cooling Liquids under Pressure, of which the following is a specification.

The nature of this invention consists in so constructing and arranging a chamber or chambers in a cooler that the liquid to be cooled is brought in contact with the artificially-cooled outer and inner walls of the chamber in thin sheets, and is kept in contact with said walls for such part of the time occupied in its passage from the inlet to the outlet of the cooler as to reduce the liquid to a very low temperature with great rapidity.

That others may understand the invention, it is described as follows:

The best shape for the cooler is a cylinder or a series of cylinders connected together, but is not intended to be confined to that precise form, though in this description it is described only as a cylinder or cylinders.

A metallic cylinder of suitable strength is constructed to resist the pressure of liquids charged with carbonic-acid gas, whether fermented liquids or liquids artificially aerated, and of suitable length and size for the ice-chest in which it is to be kept. In its exterior this cylinder presents no peculiar features. Within this shell is placed a series of open-mouthed metallic cups of such diameter as to leave a space outside them and within the inner surface of the shell one thirty-second part of an inch (more or less) in depth.

Figure 2:
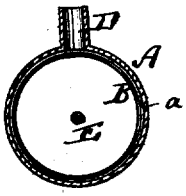
Figure 1:
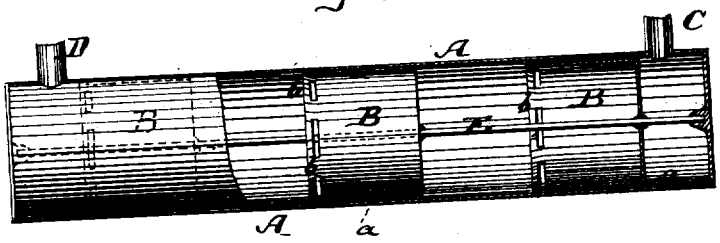
Figure 3:
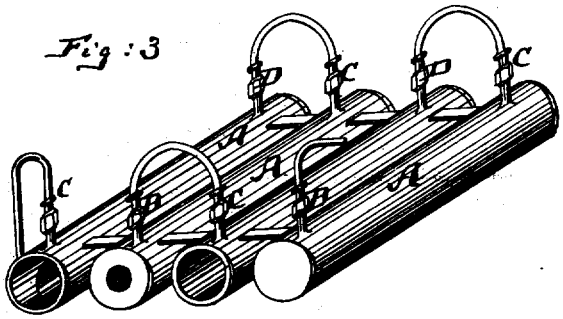

Figure 1 is a side view, partly in longitudinal section, of the improved cooler. Fig. 2 is a cross-section of same. Fig. 3 is a perspective view of a series of coolers united together.

A is the outer shell. B is a series of open-ended cylinders or cups placed into said shell, so as to leave a space, *a*, between each cylinder B and the shell A. C is the inlet-pipe; D, the outlet-pipe.

The lip of each cup is made to flare, so as to fill the entire cross-section of the shell, as shown at *b*.

Each cup is perforated in or near the lip with a number of small holes sufficient to discharge the liquid freely.

The cups are best held in place by being soldered to a stout wire, E, which passes through the center of the closed bottom of each cup. The ends of the wire on which they are strung fit each into a socket in the head of the cylinder.

The liquid entering at the supply-port fills the space behind the bottom of the first cup and passes in a thin sheet between the shell and the outside of the cup, being rapidly cooled in its progress, then passes through the small holes in or near the lip of the cup into the cup and space between it and the next cup, and on in a thin sheet again between the second cup and the shell through the holes in or near the lip of the second cup, and thus on until it reaches the discharge-port.

By this arrangement a comparatively large quantity of liquid is kept constantly cooled to a very low temperature.

For the purpose of cooling soda-water on draft the cooler is most advantageously made with a series of cooling-cylinders connected together by suitable tubes, and of the proper length and size to be placed in the ice-compartment of the soda apparatus, as shown at Fig. 3.

I claim—

1. A cooler composed of an outer cylinder, A, and an inner cylinder or cup, B, the cup having one end open, substantially as herein shown and described.

2. The combination of the shell A with the cup or cups B, each cup having flaring lip *b*, apertures near said lip, one open end, and one closed end, substantially as herein shown and described.

JOHN MATTHEWS.

Witnesses:

DAVID WHITE,
JOHN STEVENS.